United States Patent
Genssen (10) Patent No.: US 8,394,223 B2
(45) Date of Patent: Mar. 12, 2013

(54) PRESSING APPARATUS AND PRESSING AND DEPOSITING SYSTEM FOR DEPOSITING A SLIVER ON A DOUBLE-CURVED SURFACE, AND USE AND METHOD

(75) Inventor: Marcel Genssen, Plauen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/240,928

(22) Filed: Sep. 22, 2011

(65) Prior Publication Data

US 2012/0073750 A1  Mar. 29, 2012

Related U.S. Application Data

(63) Continuation of application No. PCT/EP2010/053158, filed on Mar. 12, 2010.

(60) Provisional application No. 61/162,540, filed on Mar. 23, 2009.

(30) Foreign Application Priority Data

Mar. 23, 2009  (DE) ......................... 10 2009 014 488

(51) Int. Cl.
   *B32B 37/00*  (2006.01)
(52) U.S. Cl. ........ 156/242; 156/245; 156/166; 156/433; 156/441; 156/523; 156/573
(58) Field of Classification Search .................. 156/166, 156/242, 245, 441, 433, 573, 523
   See application file for complete search history.

(56) References Cited

U.S. PATENT DOCUMENTS

| | | | |
|---|---|---|---|
| 4,292,108 A * | 9/1981 | Weiss et al. .................... | 156/259 |
| 4,750,965 A | 6/1988 | Pippel et al. | |
| 5,011,563 A | 4/1991 | Shinno et al. | |
| 5,123,151 A | 6/1992 | Uehara et al. | |
| 5,447,586 A * | 9/1995 | Tam ................................ | 156/64 |
| 5,454,897 A * | 10/1995 | Vaniglia ......................... | 156/166 |
| 5,468,531 A | 11/1995 | Kikukawa et al. | |
| 6,267,712 B1 | 7/2001 | Franke | |
| 6,390,169 B1 * | 5/2002 | Johnson ......................... | 156/523 |

(Continued)

FOREIGN PATENT DOCUMENTS

DE  102006058097 A1  6/2007

(Continued)

OTHER PUBLICATIONS

International Preliminary Report dated Sep. 27, 2011 for International Application No. PCT/EP2010/053158.

(Continued)

*Primary Examiner* — Jeff Aftergut
(74) *Attorney, Agent, or Firm* — Ingrassia Fisher & Lorenz P.C.

(57) ABSTRACT

A pressing apparatus is provided for depositing a sliver on a surface with a first segment and at least one second segment that can respectively roll along the surface. The pressing apparatus furthermore features an assembly frame for holding the segments. The first segment features a first rolling element and a suspension apparatus and the second segment features a second rolling element. The suspension apparatus is designed for attaching the first segment to the assembly frame and for rotatably mounting the first rolling element on the assembly frame. The suspension apparatus is designed for allowing a relative movement between the first rolling element and the second rolling element in a radial direction of the first rolling element.

14 Claims, 3 Drawing Sheets

U.S. PATENT DOCUMENTS

| | | | |
|---|---|---|---|
| 8,042,594 B2 * | 10/2011 | Miller et al. | 156/582 |
| 2008/0000576 A1 | 1/2008 | Miller et al. | |
| 2008/0093026 A1 | 4/2008 | Naumann | |
| 2008/0157437 A1 * | 7/2008 | Nelson et al. | 264/405 |

FOREIGN PATENT DOCUMENTS

| | | | |
|---|---|---|---|
| DE | 102006058584 A1 | 6/2008 |
| EP | 0441114 A1 | 8/1991 |
| EP | 0625735 A1 | 11/1994 |
| EP | 0680818 A2 | 11/1995 |
| EP | 1293338 A1 | 3/2003 |
| FR | 2539122 A1 | 7/1984 |
| WO | 9842991 A1 | 10/1998 |

OTHER PUBLICATIONS

German Patent Application dated Mar. 23, 2009 for German Application No. 102009014488.9.

German Office Action dated Nov. 13, 2009 for German Application No. 102009014488.9.

PCT Search Report dated Jun. 28, 2010 for International Application No. PCT/EP2010/053158.

* cited by examiner

PRESSING APPARATUS AND PRESSING AND DEPOSITING SYSTEM FOR DEPOSITING A SLIVER ON A DOUBLE-CURVED SURFACE, AND USE AND METHOD

CROSS-REFERENCE TO RELATED APPLICATIONS

This application is a continuation of International Application No. PCT/EP2010/053158, filed Mar. 12, 2010, which was published under PCT Article 21(2) and which claims priority to U.S. Provisional Patent Application No. 61/162,540, submitted on Mar. 23, 2009, and of German Patent Application No. 10 2009 014 488.9, submitted on Mar. 23, 2009, the contents of which are incorporated herein by reference.

TECHNICAL FIELD

The technical field generally pertains to the depositing of slivers on surfaces and more specifically pertains to a pressing apparatus for depositing a sliver on a surface. The technical field furthermore pertains to a pressing and depositing system for depositing a sliver on a surface, the use of a pressing apparatus for depositing a sliver on a shell segment of an aircraft fuselage and a method for depositing a sliver on a surface.

BACKGROUND

EP 0 441 114 A describes a mechanism with two rollers that are covered by an elastic sliver and preferably can be used as fixing rollers in a copying machine. WO 98/42991 discloses a mechanism with a rotating bearing that is covered by an elastic sliver. DE 0 625 735 A1 describes an elastic fixing roll for copying and printing machines, where the roll comprises an elastic core and a defined coating layer. DE 10 2006 058 584 A1 and US 2008/0093026 A1 disclose a device for pressing a tape on a surface contour for a fiber/tow-placement method.

In view of the foregoing, at least one objective can be seen in providing a simple and flexible apparatus for depositing slivers on uneven surfaces. In addition, other objectives, desirable features and characteristics will become apparent from the subsequent summary and detailed description, and the appended claims, taken in conjunction with the accompanying drawings and this background.

SUMMARY

A pressing apparatus is proposed for depositing a sliver on a surface, a pressing and depositing system for depositing a sliver on a surface, the use of the pressing apparatus for depositing a sliver on a shell segment of an aircraft fuselage and a method for depositing a sliver on a surface.

According to an embodiment, a pressing apparatus is disclosed for depositing a sliver on a surface with a first segment and at least one second segment for respectively rolling along the surface and with an assembly frame for holding the segments. The first segment features a first rolling element and a suspension apparatus and the second segment features a second rolling element. The suspension apparatus is designed for attaching the first segment to the assembly frame and for rotatably mounting the first rolling element on the assembly frame. The suspension apparatus is designed for allowing a relative movement between the first rolling element and the second rolling element in a radial direction of the first rolling element.

The pressing apparatus has the advantage that it can be used for depositing a sliver, for example, with a heavy-duty thermoplastic matrix on a surface, wherein the pressing apparatus can withstand temperatures in excess of approximately 420° C. without significantly changing the structure and properties of the pressing apparatus. The sliver pre-impregnated with the matrix needs to be heated to a temperature in excess of approximately 420°, for example, in order to melt heavy-duty thermoplastic matrices such that they can bond with the surface or material already deposited thereon and form a composite. On a surface of fuselage shells or wing shells of an aircraft, for example, very high impact strength of the fuselage shells or wing shells can be achieved in this way due to the bond with the heavy-duty thermoplastic matrix such that, for example, material savings with respect to the fuselage shell or the wing shell can be realized.

A pressing apparatus of this type furthermore has the advantage that only one roll needs to be used in order to coat, for example, a surface with a complex shape or a double-curved surface with a sliver. In this case, the sliver in the form of a pre-impregnated heavy-duty thermoplastic can be melted on the surface and therefore attached to the surface in a non-slip fashion.

Such a pressing apparatus makes it possible to easily and quickly realize an automatic depositing of a heavy-duty thermoplastic sliver. In this case, the pressing apparatus can be easily installed and easily repaired. Such a pressing apparatus with a suspension apparatus furthermore makes it possible to support the first rolling element on the assembly frame in a rotatory and translatory fashion. Due to this measure, the first rolling element is arranged on the pressing apparatus such that it can be moved relative to the second rolling element. Such a flexible pressing apparatus has the advantage that a sliver can be automatically deposited on surfaces with different geometries such as, for example, on a double-curved surface of a tool or an aircraft fuselage shell, and which composites, for example, with double-curved surfaces therefore, can be manufactured. Such a pressing apparatus makes it possible to manufacture composites with curved surfaces for industries such as, for example, aeronautics, shipbuilding, transportation, astronautics and construction, as well as for vehicle roofs, hoods, fuselage shells, wing shells, etc.

The pressing apparatus has the advantage that, for example, a pre-impregnated thermoplastic sliver can be automatically deposited on a double-curved surface with a rolling element, and that the pressing apparatus essentially maintains the structure and physical properties that it has at room temperature when the sliver is heated to a processing temperature in excess of approximately 420° C.

A pressing apparatus of this type is suitable for automatically or manually depositing thermoplastic, heavy-duty thermoplastic and duroplastic slivers or pre-impregnated slivers on a surface. The pressing apparatus for automatically depositing a sliver on a surface has the following advantages: composites can be reproduced with similar quality; the automatic depositing of the sliver on the surface may be faster than manual depositing; cost savings can be realized due to the smaller workforce required in comparison with manual depositing methods. In contrast to a manual manufacture, an online control in the form of suitable image acquisition systems can be installed. The rolling elements of the segments of the pressing apparatus may be realized in the form of rolling elements with a recess in the center of the rolling elements or in the form of massive rolling elements without recess.

According to an embodiment, the suspension apparatus features a (particularly mechanical) spring assembly such that a relative movement between the first rolling element and the second rolling element can be realized in a radial direction of the first rolling element by compressing or expanding the spring assembly or springs of the spring assembly, respectively. The spring assembly may feature one or more springs. In this context, the term mechanical spring or spring assembly may refer to an elastic solid body such as, e.g., one or more coil springs, leaf springs, disc springs or the like.

In contrast to pneumatic or hydraulic springs, a mechanical spring or spring assembly can be realized such that it can be used within a broad temperature range such as, for example, a range up to approximately 420° C. without significantly changing its mechanical properties. In this way, a cooling system for the suspension apparatus or other means for compensating the temperature fluctuations are not necessary.

According to an embodiment, the suspension apparatus of the first segment has a first suspension apparatus with a first spring assembly. The second segment features a second suspension apparatus that is designed for attaching the second segment to the assembly frame and for rotatably mounting the second rolling element on the assembly frame. The pressing apparatus may feature a plurality of identically constructed segments with identically constructed suspension apparatuses.

According to an embodiment, a relative movement between the first rolling element and the assembly frame can be realized in a radial direction of the first rolling element by compressing or expanding the (first) spring assembly. According to an embodiment, the second suspension apparatus features a second (particularly mechanical) spring assembly.

According to an embodiment, a relative movement between the second rolling element and the assembly frame can be realized in a radial direction of the second rolling element by compressing or expanding the spring assembly or springs of the spring assembly, respectively.

According to an embodiment, the (first and second) spring assembly comprises two springs that lie opposite of one another referred to the assembly frame and can be compressed in the radial direction. In other words, two oppositely arranged springs may be provided for each segment.

According to an embodiment, the assembly frame features an opening in the radial direction. The suspension apparatus comprises a sleeve that is at least partially accommodated in the opening and guided in the radial direction by the opening. A spring of the spring assembly is accommodated in a hollow space formed by the sleeve and the opening. The spring may be arranged in such a way that it can be compressed and expanded (elongated) in the radial direction.

According to an embodiment, the assembly frame features two oppositely arranged openings for accommodating a coil spring and a sleeve. The openings may be arranged in the radial direction.

According to another embodiment, the suspension apparatus features a sleeve and a spring. The sleeve and the spring are arranged on the first segment and the assembly frame in such a way that a relative movement between the first rolling element and the second rolling element can be realized in the radial direction of the first rolling element by compressing and expanding the spring. Such a pressing apparatus makes it possible to define the depositing pressure, with which the sliver is pressed against the surface when it is deposited thereon, by means of the spring stiffness of the spring. The pressing apparatus has the advantage that it can be easily manufactured, for example, with the aid of a simple tool for mounting the sleeve.

According to another embodiment, the surface is a curved surface. According to another embodiment, the surface is a double-curved surface.

According to another embodiment, the spring is designed for generating an opposing force when the first rolling element carries out the relative movement in the radial direction of the first rolling element. The relative movement is suitable for compensating a curvature of the surface.

According to another embodiment, the pressing apparatus furthermore features a frame. The frame is designed for being attached to the assembly frame.

According to another embodiment, the pressing apparatus furthermore features a pin. The pin is designed for attaching the frame to the assembly frame. In such a pressing apparatus, the pin may be realized, for example, in the form of a screw or a bolt in order to attach the frame to the assembly frame by means of the screw.

According to another embodiment, the suspension apparatus features a bearing. The bearing is designed for rotatably mounting the first rolling element on the assembly frame. The bearing is selected from the group consisting of ball bearings, sliding bearings and rolling bearings.

According to another embodiment, the pressing apparatus furthermore features an elastic material and the bearing features a sliding ring. The elastic material is designed for covering the sliding ring. The sliding ring covered with the elastic material is designed for realizing an adaptation of the pressing apparatus to changes in the curvature of the surface.

The assembly frame of such a pressing apparatus is designed for moving along the surface, on which the sliver is deposited, while the sliding ring of the ball bearing is designed for turning due to the friction with the surface.

According to another embodiment, the bearing is realized with a lip seal in order to prevent a contamination of the surface or the sliver with oil or lubricating grease.

According to another embodiment, the suspension apparatus or the bearing is designed for allowing a relative movement of the first rolling element on the order of approximately ±5% of the diameter of the first rolling element.

According to another embodiment, the suspension apparatus features a sleeve for guiding the spring assembly. According to another embodiment, the sleeve and the assembly frame feature stopping faces in order to limit the movement of the first rolling element relative to the assembly frame. For example, the relative movement of the segments may be limited to approximately 5% of the diameter of the rolls.

According to another embodiment, a pressing and depositing system for depositing a sliver on a surface with a pressing apparatus according to one of the preceding embodiments and a robot is proposed. The pressing apparatus is arranged on a robotic arm of the robot. The robotic arm is designed for moving the pressing apparatus along the surface. Such a pressing and depositing system makes it possible for the robotic arm to also move the pressing apparatus in a vertical direction perpendicular to the surface or in a transverse direction to the surface. The pressing and depositing system may be realized rigidly in the direction of the surface, wherein the surface is realized such that it can be moved in the direction of the pressing apparatus or relative to the pressing apparatus, respectively.

According to another embodiment, the pressing and depositing system furthermore features a spool, a deflection roll and to tension rolls. The spool is designed for unwinding the sliver wound up on the spool. The deflection roll is designed for deflecting the sliver being unwound from the spool in the direction of the surface. The tension rolls are designed for drawing the deflected sliver in the direction of the surface, and the pressing roll is designed for depositing the sliver on the surface. The sliver can also be unwound without tension rolls, namely with the aid of the clamping force between the pressing roll and the surface. In this case, the tension rolls act as guide rolls.

According to another embodiment, the system is designed for heating the sliver to approximately 420° C. According to another exemplary embodiment of the invention, the utilization of a pressing apparatus of one of the preceding embodiments for depositing a sliver on a shell segment of an aircraft fuselage and thusly increasing the strength of the aircraft fuselage is proposed.

Such a utilization of a pressing apparatus makes it possible, for example, to deposit a pre-impregnated thermoplastic sliver for sealing the aircraft fuselage on a shell segment and to thusly seal the aircraft fuselage. Such a utilization of a pressing apparatus has the advantage, for example, that the impact strength of the aircraft fuselage is increased.

According to another embodiment, a method for depositing a sliver on a surface is proposed. The method features a first step for attaching a first segment with a first rolling element and a segment with a second rolling element to an assembly frame. In a second step, the rolling elements are rotatably mounted on the assembly frame. The movement of the first rolling element in a direction along the surface takes place in a third step, and a relative movement between the first rolling element and the second rolling element is carried out in a radial direction of the first rolling element in a last step.

According to another embodiment, the method comprises: attaching a spring assembly to the first segment and the assembly frame such that a relative movement between the first rolling element and the second rolling element can be realized in the radial direction of the first rolling element by compressing and expanding the spring(s) of the spring assembly. According to another embodiment, the method comprises: heating the sliver that is pre-impregnated with a matrix to a temperature in excess of approximately 420° C. According to another embodiment, the method comprises: depositing the sliver on a shell segment of an aircraft fuselage in order to increase the strength of the aircraft fuselage.

The individual characteristics of the different exemplary embodiments can also be combined among one another such that advantageous effects which exceed the sum of the individual effects may be realized in certain instances even though they are not expressly described herein. It should be noted, in particular, that the characteristics described above and below with respect to the pressing apparatus can also be implemented in the pressing and depositing system and in the method and vice versa.

These and other embodiments are explained and elucidated with reference to the exemplary embodiments described below.

BRIEF DESCRIPTION OF THE DRAWINGS

The present invention will hereinafter be described in conjunction with the following drawing figures, which are not true-to-scale, and where like numerals denote like elements, and.

DETAILED DESCRIPTION

The foregoing summary and the following detailed description are merely exemplary in nature and is not intended to limit application and uses. Furthermore, there is no intention to be bound by any theory presented in the preceding background or summary or the following detailed description.

Figure 1:
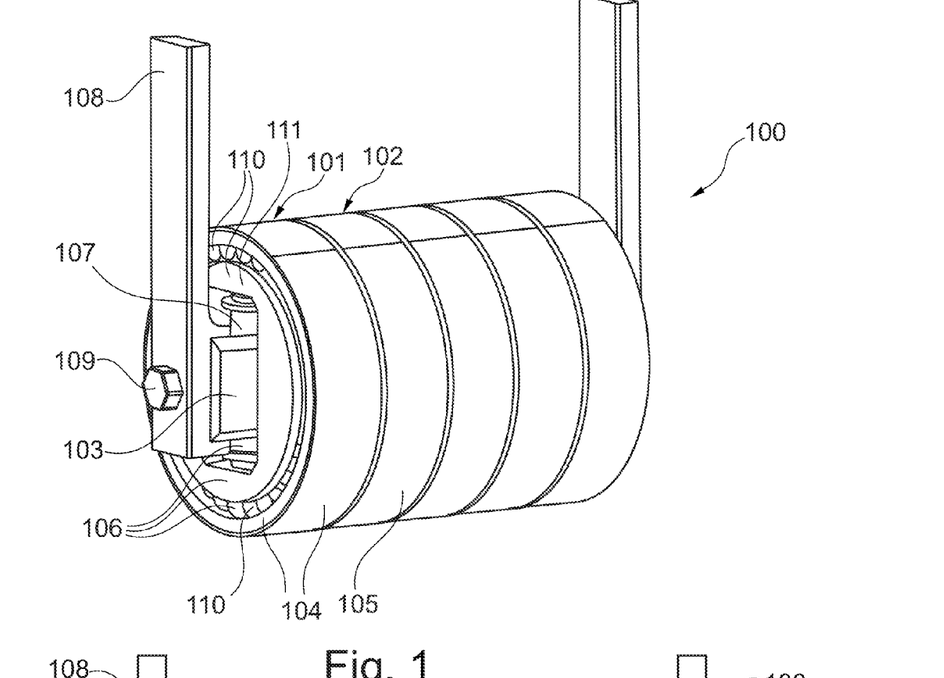
FIG. 1 shows a perspective view of a pressing apparatus for depositing a sliver on a surface according to an embodiment.

FIG. 1 shows a perspective view of a pressing apparatus 100 for depositing a sliver on a surface with a first segment 101 and at least one second segment 102 for rolling along the surface, and with an assembly frame 103 for holding the segments 101, 102. The segments 101, 102 are arranged adjacent to one another. Three additional segments are arranged in a row adjacent to the second segment 102, but not identified by reference symbols in this figure, as well as in FIG. 2. The assembly frame 103 is mounted on a frame 108 by means of a screw 109 or a pin, respectively.

The first segment 101 features a first rolling element 104, as well as a first suspension apparatus 106 with a sleeve 107 and a bearing 110 that features a sliding ring 111. The second segment 102 features a second rolling element 105 and a second suspension apparatus that is constructed identical to the first suspension apparatus 106. The suspension apparatus 106 is designed for attaching the first segment 101 to the assembly frame 103 and for rotatably mounting the first rolling element 104 on the assembly frame 103. The suspension apparatus is also designed for allowing a relative movement between the first rolling element 104 and the second rolling element 105 in a radial direction of the first rolling element 104. The rolling elements 104, 105 of the segments 101, 102 may be realized in the form of rolling elements 104, 105 with a recess in the center of the rolling elements or in the form of massive rolling elements 104, 105 without recess (not illustrated in FIG. 1).

The first suspension apparatus 106 features two sleeves 107 that are guided in the radial direction R by two openings in the assembly frame 103. The openings and the sleeves 107 may, for example, have a circular cross section, wherein the outside diameter of the sleeves 107 differs from the diameter of the openings by a small clearance. Each of the sleeves 107 features a tubular jacket and a seal on the end facing away from the assembly frame such that the sleeve and the opening form a cylindrical hollow space, in which a coil spring 203 is accommodated. Two openings with two respective sleeves 107 and two respective springs 203 are provided for each of the suspension apparatuses 106. Each spring assembly 203 therefore respectively features two springs.

On its inner side, the bearing 110 features an opening that accommodates another end of the sleeve 107. The sleeve 107 is fixed on the bearing 110 with this end. In order to limit the movement of the segments relative to the assembly frame, each sleeve 107 may be provided with stopping faces that are realized in the form of annular projections around the jacket of the sleeve 107 and can be supported on an outer surface of the assembly frame 103.

Figure 2:
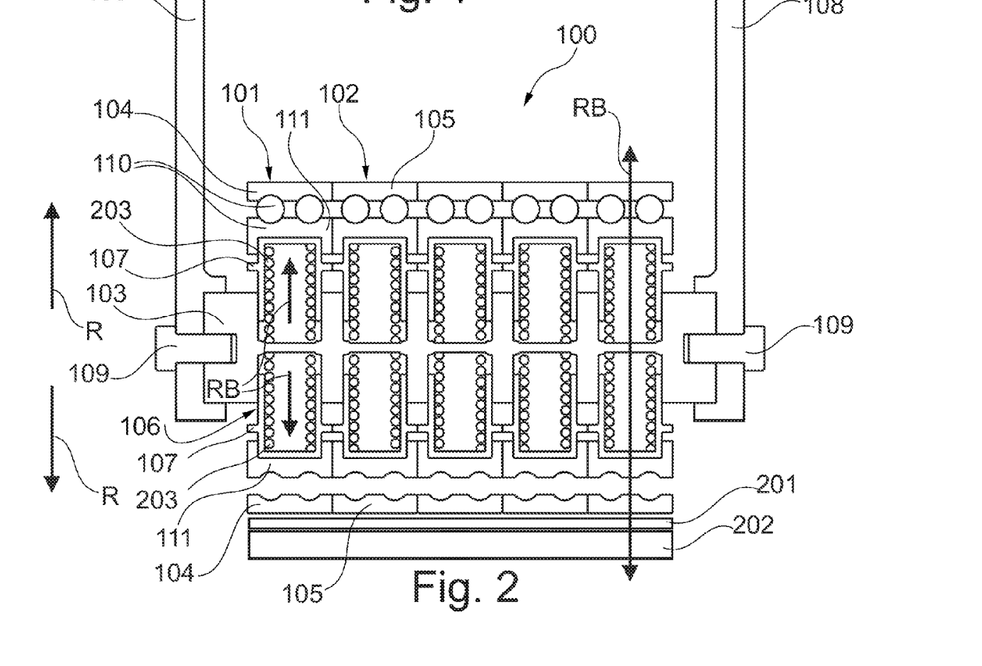
FIG. 2 shows a schematic longitudinal section through the pressing apparatus of FIG. 1 for depositing a sliver according to an embodiment.

FIG. 2 shows a longitudinal section through the pressing apparatus 100 of FIG. 1 with a frame 108, to which an assembly frame 103 is attached by means of a pin 109. A suspension apparatus 106 with a sleeve 107 and a spring 203 is arranged on the first segment 101 and the assembly frame 103 in such a way that a relative movement RB between the first rolling element 104 of the first segment 101 and the second rolling element 105 of the second segment 102 can be realized in the radial direction R of the first rolling element 104 by compressing and expanding the spring 203.

FIG. 2 furthermore shows a bearing 110 with a sliding ring 111, to which the sleeve 107 is attached, wherein the spring 203 that allows the relative movement RB between the first rolling element 104 and the second rolling element 105 is arranged on the sleeve 107. The bearing 110 features an elongated opening, in which the assembly frame 103 and the suspension apparatus 106 are accommodated. The assembly frame 103 is guided in the opening by the sides of the opening that extend parallel to the radial direction R. The pressing apparatus 100 is designed for depositing the sliver 201 on a surface 202.

Figure 3:
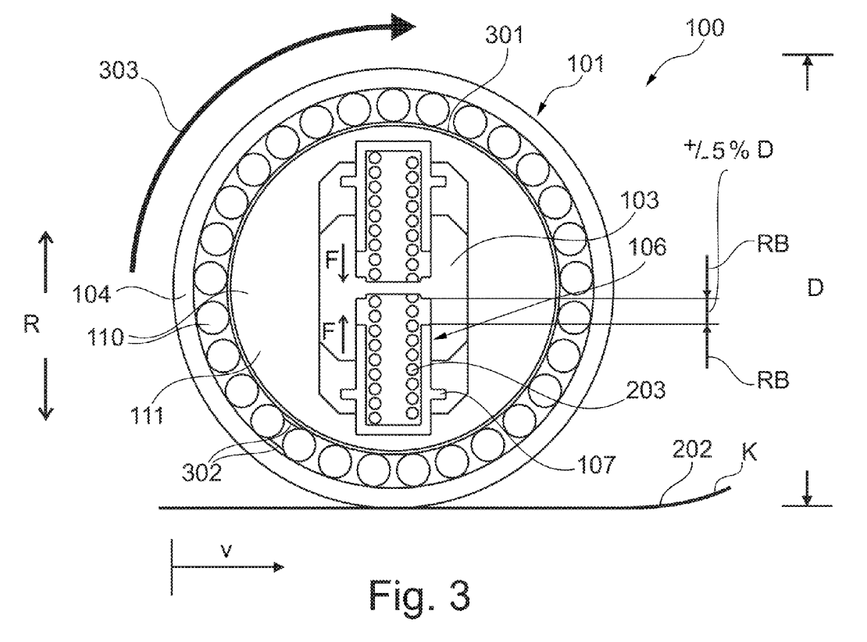
FIG. 3 shows a schematic cross section through a segment of the pressing apparatus of FIG. 2 for depositing a sliver on a surface according to an embodiment.

FIG. 3 shows a cross section through the pressing apparatus 100 of FIG. 2 that turns in a direction 303 on a curved surface 202 with a curvature K and therefore moves in the direction of the surface 202 with a speed v. The first segment 101 features a first rolling element 104, as well as a bearing 110 that is arranged on the rolling element 104 and features a sliding ring 111. The sliding ring 111 is covered with an elastic material 301. The sliding ring 111 covered with the elastic material 301 is designed for realizing an adaptability or contour adaptability of the pressing apparatus 100 to changes in the curvature K of the surface 202. The elastic material may be arranged on the inner side of the rolling element and ensure the adaptability of the pressing apparatus 100 to changes in the curvature K of the surface 202 (not illustrated in FIG. 3).

The bearing 110 is realized with a lip seal 302 in order to prevent a contamination of the surface 202 or the sliver 201 with oil or lubricating grease.

The suspension apparatus 106 with the sleeve 107 and the spring 203 allows a relative movement RB of the first rolling element 104 on the order of approximately +/−5% of the diameter D of the first rolling element 104.

The sleeve 107 and the spring 203 are arranged on the first segment 101 and the assembly frame 103 in such a way that the relative movement RB between the first rolling element 104 and the (not-shown) second rolling element can be realized in the radial direction R of the first rolling element 104 by compressing and expanding the spring 203.

Figure 4A:
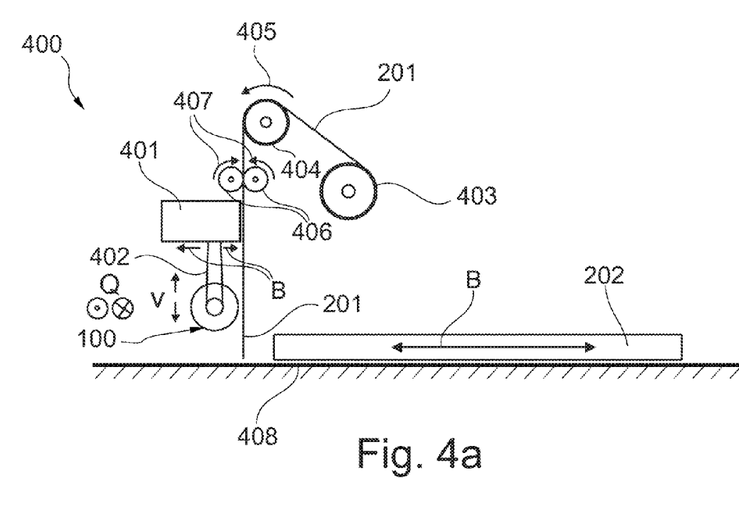
FIG. 4*a* shows a pressing and depositing system for depositing a sliver on a surface according to an embodiment.

FIG. 4a shows a pressing and depositing system 400 for depositing a sliver 201 on a surface 202 with a pressing apparatus 100 and a robot 401. The pressing apparatus 100 is arranged on a robotic arm 402 of the robot 401. The robotic arm 402 is designed for moving the pressing apparatus 100 in a direction B along the surface 202, as well as in a transverse direction Q to the surface 202 and a vertical direction V to the surface 202.

The surface 202 can move in a direction B toward the pressing apparatus 100 on a depositing rack 408 and thusly allow the depositing of the sliver 201 on the surface with the aid of the pressing apparatus 100. The sliver 201 is wound up on a spool 403 and is deflected in a direction extending perpendicular to the surface 202 by a deflection roll 404 that turns in a direction 405. Two tension rolls 406 that turn toward one another in opposite directions 407 subsequently draw the sliver 201 farther in the direction of the surface 202 and the pressing apparatus 100 until the sliver 201 reaches the pressing apparatus 100. Subsequently, the sliver 201 is deposited on the surface 202 due to a movement of the pressing apparatus 100 in the direction B of the surface 202 by means of the robotic arm 402 or a movement of the surface 202 in the direction of the pressing apparatus 100 or both.

Figure 4B:
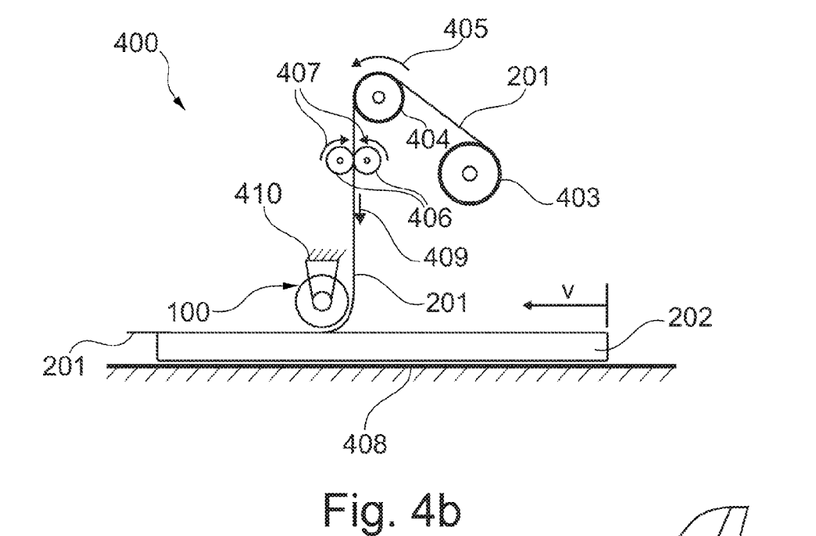
FIG. 4*b* shows the pressing and depositing system for depositing a sliver on a surface of FIG. 4*a* without a robot according to another embodiment.

FIG. 4a shows the state, in which the sliver 201 is not yet applied to the pressing apparatus 100 and therefore not yet deposited on the surface 202. FIG. 4b shows the pressing and depositing system 400 for depositing a sliver 201 on a surface 202 of FIG. 4b without the robot 401 that is illustrated in FIG. 4a and serves for attaching the pressing apparatus 100. In FIG. 4b, the sliver 201 was already drawn in the direction 409 of the pressing apparatus 100, is applied to the pressing apparatus 100 and deposited on the surface 202. In this case, the surface 202 moves in the direction of the pressing apparatus 100 on the depositing rack 408 with a speed v, wherein the pressing apparatus is rigidly arranged on a mounting 400 and therefore immovably fixed in a longitudinal direction of the surface 202 (in the direction, in which the surface moves with the speed v).

Figure 5:
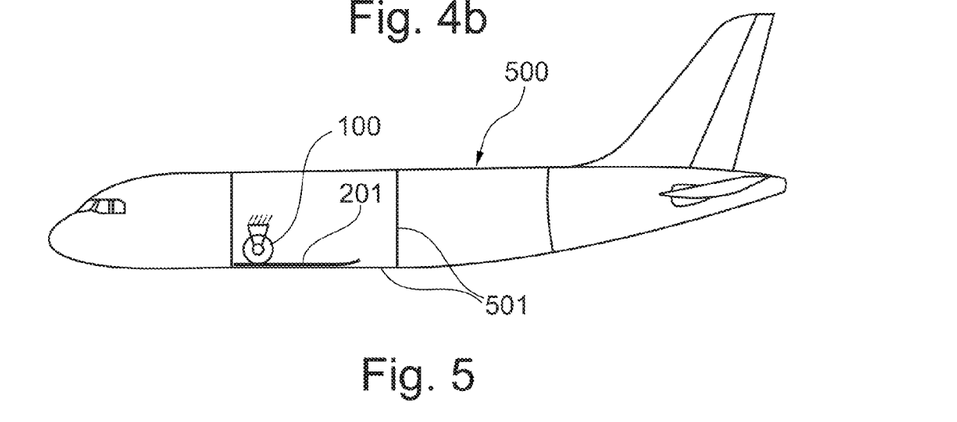
FIG. 5 shows the utilization of a pressing apparatus for depositing a sliver on a shell segment of an aircraft fuselage according to an embodiment.

FIG. 5 shows the utilization of a pressing apparatus 100 for depositing a sliver 201 on a shell system 501 of an aircraft fuselage 500 in order to respectively increase the strength or impact strength of the aircraft fuselage 500.

Figure 6:
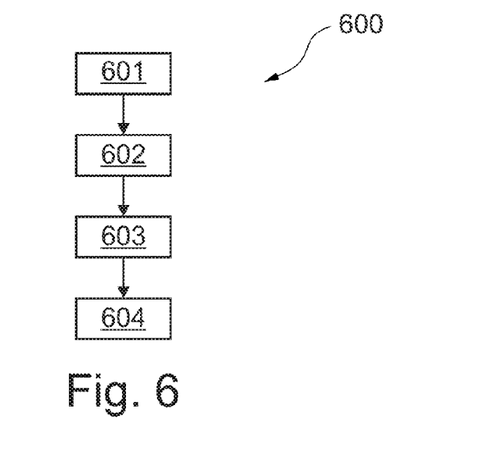
FIG. 6 shows a flow chart of the method for depositing a sliver on a surface according to an embodiment.

FIG. 6 shows a method 600 for depositing a sliver on a surface with the following steps: in step 601, a first segment with a first rolling element and a second segment with a second rolling element are attached to an assembly frame. In step 602, the rolling elements are rotatably mounted on the assembly frame. In step 602, the first rolling element moves in a direction along the surface. In the last step 604, a relative movement between the first rolling element and the second rolling element is carried out in a radial direction of the first rolling element.

Although the invention was described with reference to the exemplary embodiments, different changes and modifications can be carried out without deviating from the scope of afforded protection set forth by the claims. The pressing apparatus for depositing a sliver on a surface can be used for simply curved surfaces, as well as for double-curved surfaces, in various industries such as the transport industry and the construction industry, as well as in aircraft, ships, means of transport and in astronautics.

As a supplement, it should be noted that "comprising" or "featuring" does not exclude any other elements or steps, and that "a" or "an" does not exclude a plurality. The pressing apparatus therefore may, in particular, feature more than one assembly frame, more than one segment, more than one frame, more than one pin and more than one elastic material, the first segment may feature more than one first rolling element or more than one suspension apparatus, the second segment may feature more than one second rolling element, the suspension apparatus may feature more than one sleeve, more than one spring or more than one bearing, the bearing may feature more than one sliding ring or more than one lip seal and the pressing and depositing system may feature more than one pressing apparatus or more than one robot, as well as the robot may feature more than one robotic arm. The pressing apparatus, as well as the pressing and depositing system, are able to deposit, for example, several slivers on one or more surfaces.

It should furthermore be noted that characteristics or steps that were described with reference to one of the above exemplary embodiments can also be used in combination with other characteristics or steps of other above-described exemplary embodiments.

Lastly, and to reiterate, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A pressing and depositing system for depositing a sliver on a surface, with the system comprising:
    a pressing apparatus for depositing the sliver on the surface, the pressing apparatus comprising:
        a first segment comprising a first rolling element and configured to roll along the surface;
        a second segment comprising a second rolling element and configured to roll along the surface;
        an assembly frame configured to hold the first segment and the second segment and comprising an opening in a radial direction;
        a suspension apparatus that is configured to attach the first segment to the assembly frame, and rotatably mount the first rolling element on the assembly frame, the suspension apparatus comprising:
            a spring assembly configured such that a relative movement between the first rolling element and the second rolling element is realized in the radial direction of the first rolling element due to an action by the spring assembly, the spring assembly comprising:
                a first sleeve at least partially received in the opening of the assembly frame that defines a first hollow space, with the first sleeve guided by the opening in the radial direction;
                a first spring accommodated in the first hollow space of the first sleeve and the opening;
                a second sleeve at least partially received in the opening of the assembly frame that defines a second hollow space, with the second sleeve guided by the opening in the radial direction, the second sleeve having a first stopping face that cooperates with a second stopping face of the assembly frame to limit movement of the first rolling element relative to the assembly frame;
                a second spring accommodated in the second hollow space of the sleeve and the opening; and
    a robot comprising a robotic arm, the robotic arm configured to:
        receive the pressing apparatus; and
        move the pressing apparatus along the surface.

2. The pressing and depositing system of claim 1, wherein the system is configured to heating the sliver to approximately 420° C.

3. A method for depositing a sliver on a surface, comprising:
    attaching a first segment with a first rolling element to an assembly frame;
    attaching a second segment with a second rolling element to the assembly frame;
    attaching a spring assembly to the first segment and the assembly frame in such a way that a relative movement between the first rolling element and the second rolling element can be realized in a radial direction of the first rolling element by an action of the spring assembly;
    inserting a sleeve in an opening defined in the assembly frame so that the sleeve is at least partially accommodated in the opening in the radial direction, the sleeve guided by the opening in the radial direction;
    accommodating a spring of the spring assembly in the hollow space formed by the sleeve and the opening;
    rotatably mounting the first rolling element and the second rolling element on the assembly frame;
    moving the first rolling element in a direction along the surface; and
    carrying out the relative movement between the first rolling element and the second rolling element in the radial direction of the first rolling element.

4. The method of claim 3, furthermore comprising:
    heating the sliver that is pre-impregnated with a matrix to a temperature in excess of approximately 420° C.

5. The method of claim 3, furthermore comprising:
    depositing the sliver on a shell segment of an aircraft fuselage.

6. A pressing apparatus for depositing a sliver on a surface, comprising:
    a first segment comprising a first rolling element and configured to roll along the surface;
    a second segment comprising a second rolling element and configured to roll along the surface;
    an assembly frame configured to hold the first segment and the second segment and comprising an opening in a radial direction; and
    a suspension apparatus that is configured to attach the first segment to the assembly frame, and rotatably mount the first rolling element on the assembly frame, the suspension apparatus comprising:
        a spring assembly configured such that a relative movement between the first rolling element and the second rolling element is realized in the radial direction of the first rolling element due to an action by the spring assembly, the spring assembly comprising:
            a sleeve at least partially received in the opening of the assembly frame that defines a hollow space, the sleeve guided by the opening in the radial direction; and
            a spring accommodated in the hollow space of the sleeve and the opening.

7. The pressing apparatus of claim 6,
    wherein the suspension apparatus of the first segment comprises a first suspension apparatus with a first spring assembly,
    wherein a first relative movement between the first rolling element and the assembly frame can be realized in a first radial direction of the first rolling element by a first action of the first spring assembly,
    wherein the second segment comprises a second suspension apparatus that is configured to attach the second segment to the assembly frame and further configured to rotatably mount the second rolling element on the assembly frame, and wherein the second suspension apparatus comprises a second spring assembly such that a second relative movement between the second rolling element and the assembly frame is realized in a second radial direction of the second rolling element by the action of the spring assembly.

8. The pressing apparatus of claim 7,
wherein the first spring assembly comprises a first spring and a second spring that lies opposite of the first spring that are referred to the assembly frame and compressible in the radial direction.

9. The pressing apparatus of claim 1,
wherein the suspension apparatus comprises a bearing that is configured to rotatably mount the first rolling element on the assembly frame.

10. The pressing apparatus of claim 9, wherein the bearing is a ball bearing.

11. The pressing apparatus of claim 9, furthermore comprising:
a bearing sliding ring;
an elastic material configured to cover the bearing sliding ring and provide an adaptability of the pressing apparatus to changes in a curvature of the surface.

12. The pressing apparatus of claim 9,
wherein the bearing is realized with a lip seal that is configured to limit contamination.

13. The pressing apparatus of claim 12,
wherein the bearing is realized with the lip seal that is configured to limit contamination of the surface.

14. The pressing apparatus of claim 1,
wherein the suspension apparatus is configured to allow a first relative movement of the first rolling element on an order of approximately ±five percent of a diameter of the first rolling element.

* * * * *